US008510559B2

(12) United States Patent　　(10) Patent No.:　　US 8,510,559 B2
Guccione et al.　　(45) Date of Patent:　　Aug. 13, 2013

(54) SECURE SESSION KEY GENERATION

(75) Inventors: Louis J. Guccione, East Chester, NY (US); Yevgeniy Dodis, New York, NY (US); Yogendra C. Shah, Exton, PA (US); Inhyok Cha, Yardley, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 725 days.

(21) Appl. No.: 12/419,798

(22) Filed: Apr. 7, 2009

(65) Prior Publication Data

US 2009/0313472 A1　Dec. 17, 2009

Related U.S. Application Data

(60) Provisional application No. 61/043,007, filed on Apr. 7, 2008, provisional application No. 61/081,756, filed on Jul. 18, 2008.

(51) Int. Cl.
*H04L 9/00*　　(2006.01)
(52) U.S. Cl.
USPC ............... 713/171; 380/44; 380/46; 713/155
(58) Field of Classification Search
None
See application file for complete search history.

(56) References Cited

U.S. PATENT DOCUMENTS

| 7,953,391 B2 * | 5/2011 | Lee et al. ...................... 455/411 |
| 2006/0085848 A1 | 4/2006 | Aissi et al. | |
| 2006/0281442 A1 | 12/2006 | Lee et al. | |
| 2007/0042754 A1 | 2/2007 | Bajikar et al. | |
| 2007/0101122 A1 * | 5/2007 | Guo ............................ 713/153 |
| 2007/0157022 A1 | 7/2007 | Blom et al. | |
| 2009/0209232 A1 | 8/2009 | Cha et al. | |

FOREIGN PATENT DOCUMENTS

| CN | 1700640 | 11/2005 |
| CN | 101005359 | 7/2007 |
| CN | 101102190 | 1/2008 |
| JP | 2002-344438 | 11/2002 |
| JP | 2004-362554 | 12/2004 |
| JP | 2005-244534 | 9/2005 |
| JP | 2005-275944 | 10/2005 |
| JP | 2007-135113 | 5/2007 |
| JP | 2008-066834 | 3/2008 |
| WO | WO 2006/084183 | 8/2006 |

OTHER PUBLICATIONS

NPL document "3GPP TS 33.110" V7.2.0,2007-06 (hereinafter 33.110).*
European Patent Application No. 09729774.1: Communication pursuant to Rules 161(1) and 162 EPC, dated Nov. 17, 2010, 2 pages.

(Continued)

*Primary Examiner* — Fikremariam A Yalew
(74) *Attorney, Agent, or Firm* — Woodcock Washburn LLP (57) ABSTRACT

A method and apparatus for securing the interface between a Universal Integrated Circuit Card (UICC) and a Terminal in wireless communications is disclosed. The security of Authentication and Key Agreement (AKA) and application level generic bootstrapping architecture (GBA) with UICC-based enhancements (GBA_U) procedures is improved. A secure shared session key is used to encrypt communications between the UICC and the Terminal. The secure shared session key generated using authenticating or non-authenticating procedures.

43 Claims, 10 Drawing Sheets

(56) References Cited

OTHER PUBLICATIONS

3rd Generation Partnership Project (3GPP), TS 33.110, V1.0.0, "3rd Generation Partnership Project; Technical Specification Group Services and Systems Aspects; Key establishment between a UICC and a terminal (Release 7)", Jun. 2006, 17 pages.

Interdigital, "New Review of Threats to UICC-ME/Terminal Interfaces and Possible Impact on Other Protocols", 3GPP TSG SA WG3 Security S3#50 Meeting, S3-080087, (Sanya, China, Feb. 25-29, 2009).

Third Generation Partnership Project, "Technical Specification Group Services and System Aspects; Key Establishment Between a Universal Integrated Circuit Card (UICC) and a Terminal (Release 8)", 3GPP TS 33.110 V8.0.0 (Dec. 2008).

Third Generation Partnership Project, "Technical Specification Group Services and System Aspects; Key Establishment Between a Universal Integrated Circuit Card (UICC) and a Terminal (Release 7)", 3GPP TS 33.110 V7.5.0 (Mar. 2008).

Third Generation Partnership Project, "Technical Specification Group Services and System Aspects; 3G Security; Specification of the 3GPP Confidentiality and Integrity Algorithms; Document 1:f8 and f9 Specification (Release 1999)", 3GPP TS 35.201 V3.2.0 (Dec. 2001).

Third Generation Partnership Project, "Technical Specification Group Services and System Aspects; 3G Security; Specification of the 3GPP Confidentiality and Integrity Algorithms; Document 1: f8 and f9 Specification (Release 8)", 3GPP TS 35.201 V8.0.0 (Dec. 2008).

Third Generation Partnership Project, "Technical Specification Group Services and System Aspects; 3G Security; Specification of the 3GPP Confidentiality and Integrity Algorithms; Document 1: f8 and f9 Specification (Release 5)", 3GPP TS 35.201 V5.0.5 (Jun. 2002).

Third Generation Partnership Project, "Technical Specification Group Services and System Aspects; 3G Security; Specification of the 3GPP Confidentiality and Integrity Algorithms; Document 1: f8 and f9 Specification (Release 6)", 3GPP TS 35.201 V6.1.0 (Sep. 2005).

Third Generation Partnership Project, "Technical Specification Group Services and System Aspects; 3G Security; Specification of the 3GPP Confidentiality and Integrity Algorithms; Document 1: f8 and f9 Specification (Release 7)", 3GPP TS 35.201 V7.0.0 (Jun. 2007).

Third Generation Partnership Project, "Technical Specification Group Services and System Aspects; 3G Security; Security Architecture (Release 4)", 3GPP TS 33.102 V8.0.0 (Dec. 2002).

Third Generation Partnership Project, "Technical Specification Group Services and System Aspects; 3G Security; Security Architecture (Release 1999)", 3GPP TS 33.102 V3.13.0 (Dec. 2002).

Third Generation Partnership Project, "Technical Specification Group Services and System Aspects; 3G Security; Security Architecture (Release 5)", 3GPP TS 33.102 V5.7.0 (Dec. 2005).

Third Generation Partnership Project, "Technical Specification Group Services and System Aspects; 3G Security; Security Architecture (Release 6)", 3GPP TS 33.102 V6.5.0 (Dec. 2005).

Third Generation Partnership Project, "Technical Specification Group Services and System Aspects; 3G Security; Security Architecture (Release 7)", 3GPP TS 33.102 V7.1.0 (Dec. 2006).

Third Generation Partnership Project, "Technical Specification Group Services and System Aspects; 3G Security; Security Architecture (Release 8)", 3GPP TS 33.102 V8.2.0 (Mar. 2009).

Third Generation Partnership Project, "Technical Specification Group Services and System Aspects; Recommendations for Trusted Open Platforms (Release 8)", 3GPP TS 33.905 V8.0.0 (Dec. 2008).

Third Generation Partnership Project, "Technical Specification Group Services and System Aspects; Recommendations for Trusted Open Platforms (Release 7)", 3GPP TS 33.905 V7.0.0 (Mar. 2007).

Third Generation Partnership Project, "Technical Specification Group Services and System Aspects; Key Establishment Between a Universal Integrated Circuit Card (UICC) and a Terminal (Release 8)", 3GPP TS 33.110 V1.0.0 (Jun. 2006).

Interdigital, "New Review of Threats to UICC-ME/Terminal Interfaces and Possible Impact on Other Protocols", 3GPP TSG SA WG3 Security S3#50 Meeting, S3-080087, (Sanya, China, Feb. 25-29, 2008).

Third Generation Partnership Project, "Technical Specification Group Services and System Aspects; 3G Security; Specification of the 3GPP Confidentiality and Integrity Algorithms; Document 1: f8 and f9 Specification (Release 1999)", 3GPP TS 35.201 V3.2.0 (Dec. 2001).

Third Generation Partnership Project, "Technical Specification Group Services and System Aspects; 3G Security; Specification of the 3GPP Confidentiality and Integrity Algorithms; Document 1: f8 and f9 Specification (Release 5)", 3GPP TS 35.201 V5.0.0 (Jun. 2002).

U.S. Appl. No. 12/246,064: Non-Final Rejection, dated Aug. 24, 2011, 21 pages.

Adams et al., Internet X.509 Public Key Infrastructure Certificate Management Protocols, Network Working Group, Request for Comments: 2510, (Mar. 1999).

Blake-Wilson et al., "Transport Layer Security (TLS) Extensions", Network Working Group, Request for Comments: 3546, Updates 2246, (Jun. 2003).

Blunk et al., "PPP Extensible Authentication Protocol (EAP)", Network Working Group, Request for Comments: 2284 (Mar. 1998).

Eronen et al., "Pre-Shared Key Ciphersuites for Transport Layer Security (TLS)", Network Working Group, Request for Comments: 4279, (Dec. 2005).

European Telecommunications Standards Institute, Smart Cards; Secure Channel Between a UICC and an End-Point Terminal (Release 7), ETSI TA 102 484, V7.1.0, (Jul. 2008).

Housley et al., "Internet X.509 Public Key Infrastructure Certificate and Certificate Revocation List (CRL) Profile", Network Working Group, Request for Comments: 3280, Obsoletes: 2459, (Apr. 2002).

Myers et al., "Certificate Management Messages Over CMS", Network Working Group, Request for Comments: 2797, (Apr. 2000).

Myers et al., "Internet X.509 Certificate Request Message Format", Network Working Group, Request for Comments: 2511, (Mar. 1999).

Open Mobile Alliance Ltd., "Crypto Object for the ECMA Script Mobile Profile", Candidate Version 1.0, OMA-WAP-ECMACR-V1_0-20040615-C, (Jun. 15, 2004).

Rigney et al., "Radius Extensions", Network Working Group, Request for Comments, 2869, (Jun. 2000).

RSA Laboratories, "RKCS # 10 V1.7: Certification Request Syntax Standard", (May 26, 2000).

Third Generation Partnership Project, "Technical Specification Group Services and System Aspects; Generic Authentication Architecture (GAA); Generic Bootstrapping Architecture (Release 7)", 3GPP TS 33.220, V7.8.0, (Jun. 2007).

Third Generation Partnership Project, "Technical Specification Group Services and System Aspects; Generic Authentication Architecture (GAA); Generic Bootstrapping Architecture (Release 7)", 3GPP TS 33.220, V7.9.0, (Sep. 2007).

Third Generation Partnership Project, "Technical Specification Group Services and System Aspects; Generic Authentication Architecture (GAA); Generic Bootstrapping Architecture (Release 7)", 3GPP TS 33.220, V7.11.0, (Mar. 2008).

Third Generation Partnership Project, "Technical Specification Group Services and System Aspects; Generic Authentication Architecture (GAA); Generic Bootstrapping Architecture (Release 8)", 3GPP TS 33.220, V8.1.0, (Sep. 2007).

Third Generation Partnership Project, "Technical Specification Group Services and System Aspects; Generic Authentication Architecture (GAA); Generic Bootstrapping Architecture (Release 8)", 3GPP TS 33.220, V8.4.0, (Sep. 2008).

Third Generation Partnership Project, "Technical Specification Group Services and Systems Aspects; Key Establishment Between a UICC Hosting Device and Remote Device (Release 7)", 3GPP TS 33.259, V7.0.0, (Jun. 2007).

Third Generation Partnership Project, "Technical Specification Group Services and Systems Aspects; Key Establishment Between a UICC Hosting Device and Remote Device (Release 7)", 3GPP TS 33.259 V7.1.0, (Sep. 2007).
Third Generation Partnership Project, "Technical Specification Group Services and Systems Aspects; Key Establishment Between a UICC Hosting Device and Remote Device (Release 7)", 3GPP TS 33.259 V7.2.0, (Dec. 2007).
Third Generation Partnership Project, "Technical Specification Group Services and Systems Aspects; Key Establishment Between a UICC Hosting Device and Remote Device (Release 8)", 3GPP TS 33.259 V8.1.0, (Mar. 2008).
Third Generation Partnership Project, "Technical Specification Group Services and System Aspects Key Establishment Between a Universal Integrated Circuit Card (UICC) and a Terminal (Release 7)", 3GPP TS 33.110, V7.0.0, (Dec. 2006).
Third Generation Partnership Project, "Technical Specification Group Services and System Aspects Key Establishment Between a Universal Integrated Circuit Card (UICC) and a Terminal (Release 7)", 3GPP TS 33.110, V7.2.0, (Jun. 2006)
Third Generation Partnership Project, "Technical Specification Group Services and System Aspects Key Establishment Between a Universal Integrated Circuit Card (UICC) and a Terminal (Release 7)", 3GPP TS 33.110, V7.3.0, (Sep. 2007)
Third Generation Partnership Project, "Technical Specification Group Services and System Aspects; 3G Security; Cryptographic Algorithm Requirements (Release 7)", 3GPP TS 33.105 V7.0.0, (Jun. 2007).
Third Generation Partnership Project, "Technical Specification Group Services and System Aspects; Generic Authentication Architecture (GAA); Support for Subscriber Certificates (Release 7)", 3GPP TS 33.221 V7.0.0, (Jun. 2007).
Third Generation Partnership Project, "Technical Specification Group Services and System Aspects; Generic Authentication Architecture (GAA); Support for Subscriber Certificates (Release 7)", 3GPP TS 33.221 V7.1.0, (Dec. 2007).
Third Generation Partnership Project, "Technical Specification Group Services and System Aspects; Generic Authentication Architecture (GAA); Access to Network Application Functions Using Hypertext Transfer Protocol Over Transport Layer Security (HTTPS) (Release 7)", 3GPP TS 33.222 V7.0.0, (Sep. 2005).
Third Generation Partnership Project, "Technical Specification Group Services and System Aspects; Generic Authentication Architecture (GAA); Access to Network Application Functions Using Hypertext Transfer Protocol Over Transport Layer Security (HTTPS) (Release 7)", 3GPP TS 33.222 V7.2.0, (Sep. 2006).
Third Generation Partnership Project, "Technical Specification Group Services and System Aspects; Generic Authentication Architecture (GAA); Access to Network Application Functions Using Hypertext Transfer Protocol Over Transport Layer Security (HTTPS) (Release 7)", 3GPP TS 33.222 V7.3.0, (Dec. 2007).
Third Generation Partnership Project, "Technical Specification Group Services and System Aspects; Generic Authentication Architecture (GAA); Access to Network Application Functions Using Hypertext Transfer Protocol Over Transport Layer Security (HTTPS) (Release 8)", 3GPP TS 33.222 V8.0.0, (Jun. 2008).
Trusted Computing Group, "Mobile Phone Work Group Use Case Scenarios", V2.7, (2005).
Trusted Computing Group, "TCG Mobile Reference Architecture", Specification Version 1.0, Revision 1, (Jun. 12, 2007).
Trusted Computing Group, "TCG Mobile Trusted Module Specification", Specification Version 1.0, Revision 1, (Jun. 12, 2007).
Trusted Computing Group, "TCG Specification Architecture Overview", Specification Revision 1.2, (Apr. 28, 2004).
Trusted Computing Group, "TPM Main Part 1 Design Principles", Specification Version 1.2, Revision 85, (Feb. 13, 2005).
Wireless Application Protocol Forum, Ltd., "Wireless Application Protocol Public Key Infrastructure Definition", WPKI, WAP-217-WPKI, Version 24, (Apr. 24, 2001).
Wireless Application Protocol Forum, Ltd., "Wireless Identity Module", Part: Security, Version Jul. 12, 2001, WAP-260-WIM-20010712-a, (Jul. 12, 2001).
Third Generation Partnership Project, "Technical Specification Group Services and System Aspects; Key Establishment between a Universal Integrated Circuit Card (UICC) and a Terminal", (Release 7) 3GPP TS 33.110 V7.2.0 (Jun. 2007).
Third Generation Partnership Project, "Technical Specification Group Services and System Aspects; Generic Authentication (GAA); Support for Subscriber Certificates", (Release 7), 3GPP TS 33.221 V7.0.0, (Jun. 2007).
Third Generation Partnership Project, 3GPP 33.102, "3$^{rd}$ Generation Partnership Project; Technical Specification Group Services and System Aspects; 3G Security; Security Architecture", Release 4, 3GPP 33.102 V4.5.0, Dec. 2002, 61 pages.
Third Generation Partnership Project, ETSI TS 133.110, "Universal Mobile Telecommunications System (UMTS); Key Establishment between a UICC and a Terminal", (Release 7), 3GPP TS 33.110 V7.3.0, Oct. 2007, 13 pages.
Third Generation Partnership Project, ETSI TS 133.220, "Digital Cellular Telecommunications System (Phase 2+); Universal Mobile Telecommunications System (UMTS); Generic Authentication Architecture (GAA); Generic Bootstrapping Architecture", (Release 7), 3GPP TS 33.220 V7.9.0, Oct. 2007, 31 pages.
Third Generation Partnership Project, ETSI TS 133.259, "Digital Cellular.Telecommunications System (Phase 2+); Universal Mobile Telecommunications System (UMTS); Key Establishment Between a UICC Hosting Device and a Remote Device", (Release 7), 3GPP TS 33.259 V7.1.0, Oct. 2007, 13 pages.
3$^{rd}$ Generation Partnership Project; "3$^{rd}$ Generation Partnership Project; Technical Specification Group Services and System Aspects; 3G Security; Specification of the 3GPP Confidentiality and Integrity Algorithms; Document 1: F8 and F9 Specification", 3GPP TS 35.201 V4.1.0 (Release 4), Dec. 2001, 22 pages.
3$^{rd}$ Generation Partnership Project (3GPP), "3$^{rd}$ Generation Partnership Project; Technical Specification Group Services and System Aspects; 3G Security; Security Architecture", 3GPP TS 33.102 V8.0.0 (Release 8), Jun. 2008, 65 pages.
3$^{rd}$ Generation Partnership Project (3GPP), ETSI 133 221, V7.0.0, "Digital Cellular Telecommunications System (Phase 2+); Universal Mobile Telecommunications System (UMTS); Generic Authentication Architecture (GAA); Support for Subscriber Certificates", 3GPP TS 33.221 version 7.0.0 (Release 7), Jun. 2007, 27 pages.
3$^{rd}$ Generation Partnership Project (3GPP), ETSI 133 222, V7.2.0, "Digital Cellular Telecommunications System (Phase 2+); Universal Mobile Telecommunications System (UMTS); Generic Authentication Architecture (GAA); Access to Network Application Functions using Hypertext Transfer Protocol Layer Security (HTTPS)", 3GPP TS 33.222 version 7.2.0 (Release 7), Sep. 2006, 5 pages.
English Translation of Japanese Patent Application No. 2011-504132, Official Notice of Rejection dated Jan. 8, 2013, 4 pages.
Ikeno et al., "Modern Cryptographic Theory", First Ed., The Institute of Electronics, Information and Communication Engineers, (IEIEC), Sep. 1986, 175-178.

* cited by examiner

SECURE SESSION KEY GENERATION

CROSS REFERENCE TO RELATED APPLICATIONS

This application claims the benefit of U.S. provisional application No. 61/043,007 filed Apr. 7, 2008 and 61/081,756 filed Jul. 18, 2008, which are incorporated by reference as if fully set forth.

FIELD OF INVENTION

This application is related to wireless communications.

BACKGROUND

The Authentication and Key Agreement (AKA) procedure is used for establishing authentication and shared secret keys for a wireless transmit/receive unit (WTRU) in a $3^{rd}$ Generation Partnership Project (3GPP) communication network. The AKA provides for secure mutual authentication between two parties. In addition, the application level generic bootstrapping architecture (GBA) with UICC-based enhancements (GBA_U), which is based on AKA procedures, provides a means to enable application security. However, the AKA and the application level generic bootstrapping architecture (GBA) with UICC-based enhancements (GBA_U) procedures do not protect the security of the interface connecting the Universal Integrated Circuit Card (UICC) and Terminal of the WTRU. Critical key related material passes from the UICC to the Terminal during the AKA and GBA_U processes. As a result, the session keys (for example CK/IK and Ks_ext_NAF), are exposed during initial provisioning of the Terminal at the point of sale, when a local key has not yet been established and when an established local key expires.

Existing protocols that are designed to protect the connection between the UICC and the Terminal cannot be initiated until the AKA and GBA_U processes are complete. As a result, these protocols allow for eavesdropping of the keys. Attempts to secure the link between the Terminal and the UICC, after the AKA and GBA_U process, for other application level processes through interactions with and participation by the wireless network components, do not resolve these deficiencies.

Therefore, there exists a need for an improved method and apparatus for securing communications between a Terminal and a UICC.

SUMMARY

A method and apparatus for securing the interface between a Universal Integrated Circuit Card (UICC) and a Terminal in wireless communications is disclosed. The security of the Authentication and Key Agreement (AKA) and the application level generic bootstrapping architecture (GBA) with UICC-based enhancements (GBA_U) procedures is improved. A secure shared session key is used to encrypt communications between the UICC and the Terminal. The secure shared session key generated using authenticating or non-authenticating procedures.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment. The terminology "WTRU" and "base station" are not mutually exclusive.

Figure 1:
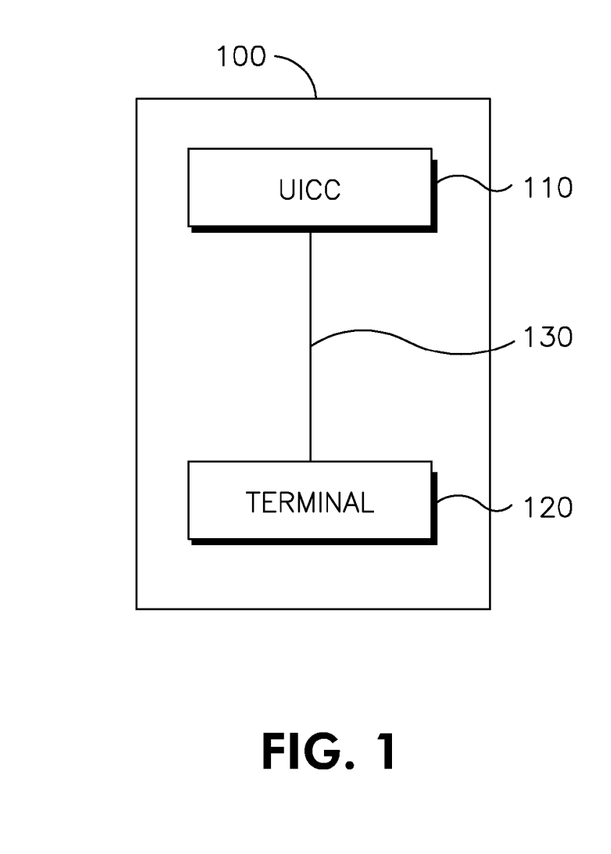
FIG. 1 shows an example of a wireless transmit/receive unit for performing secure session key generation.

FIG. 1 is an example block diagram of a wireless transmit/receive unit (WTRU) 100 for performing secure session key generation. The WTRU 100 includes a Universal Integrated Circuit Card (UICC) 110 and a Terminal 120. The UICC communicates with the Terminal via interface 130. The WTRU 100 is shown as including the UICC 110 and the Terminal 120 for illustrative purposes. The UICC 110 or the Terminal 120 may be configured in any manner so long as they are able to communicate as described herein. For example, FIG. 3 shows an example wherein the Terminal 120 is located in a connected device.

Figure 2:
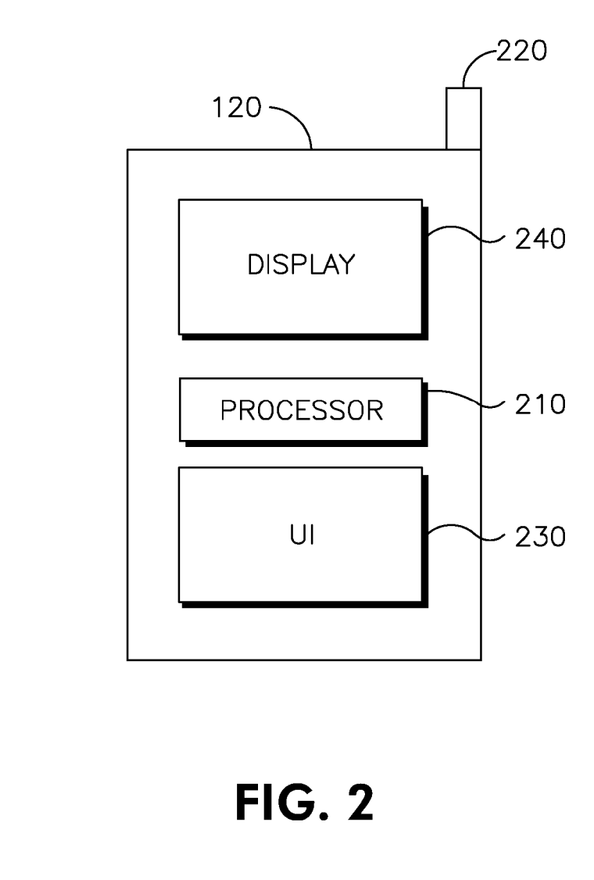
FIG. 2 shows an example of a Terminal configured as a handset for performing wireless communications.

FIG. 2 is an example block diagram of an expanded view of the Terminal 120 configured as a handset for performing wireless communication. The Terminal 120 includes a processor 210, an antenna 220, a user interface 230, and a display 240.

Figure 3:
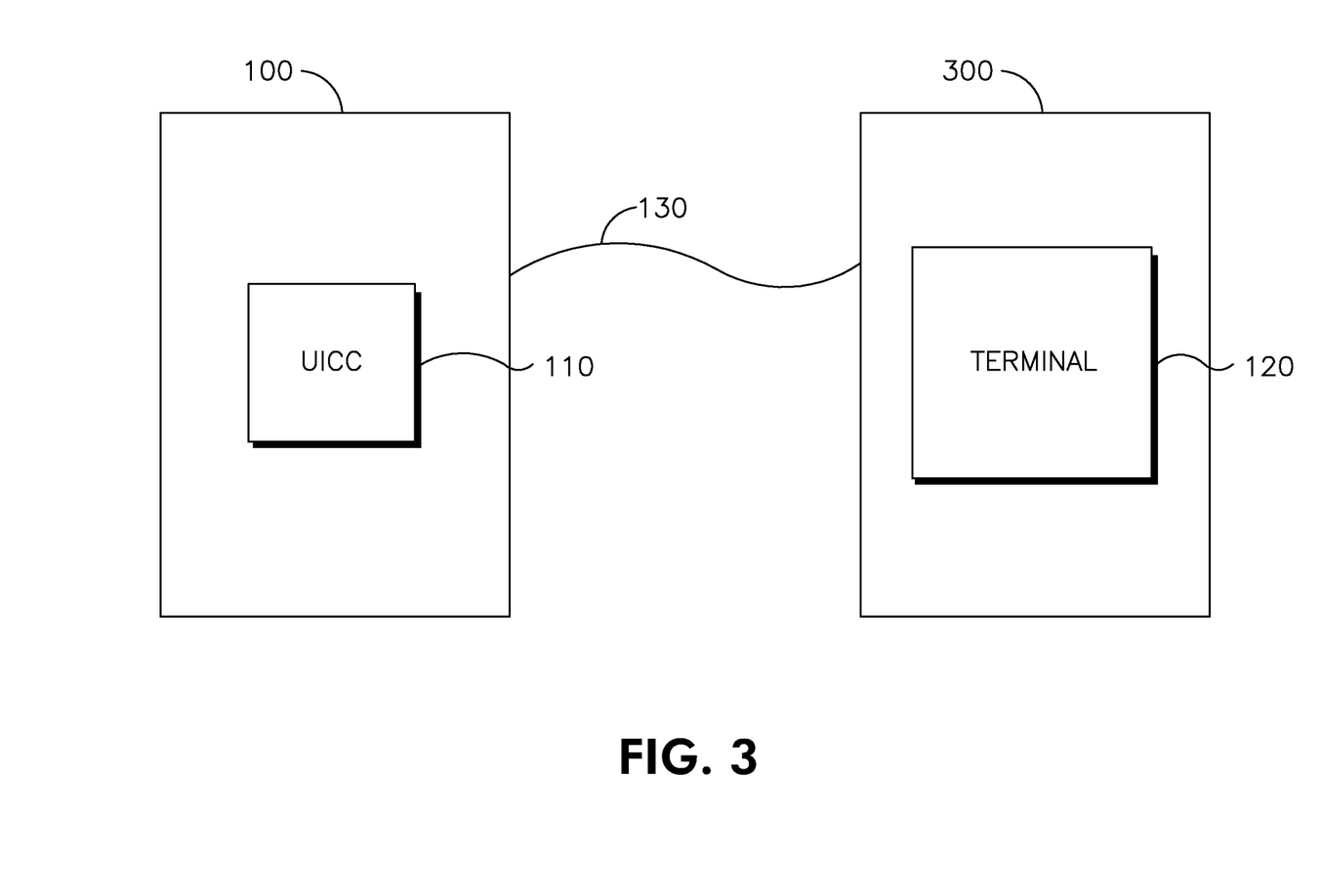
FIG. 3 shows an example of a wireless transmit/receive unit for performing secure session key generation in conjunction with connected device.

FIG. 3 is an example block diagram of a wireless transmit/receive unit (WTRU) 100 for performing secure session key generation in conjunction with a connected device 300. The UICC 10 in the WTRU 100 communicates with the Terminal 120 in a connected device 300 via the interface 130. The connected device 300 may be a personal computer (PC), or any other device configured as the Terminal 120. The interface 130 may be a wired or a wireless interface. The method and apparatus recited herein includes any other combination or configuration of a UICC 110 and a Terminal 120. Optionally, the Terminal 120 may include an internal or external UICC reader.

For example, the connected device 300 may be a laptop computer. The laptop may be connected to the internet via an Ethernet connection. The laptop may also be connected to the WTRU 100 via a Bluetooth interface 130. The UICC 110 in the WTRU 100 may then use the Terminal 120 in the laptop for performing communications requiring a secure connection. Alternatively, the Terminal 120 in the laptop may use the UICC 110 in the WTRU 100 for performing communications requiring a secure connection.

Figure 4:
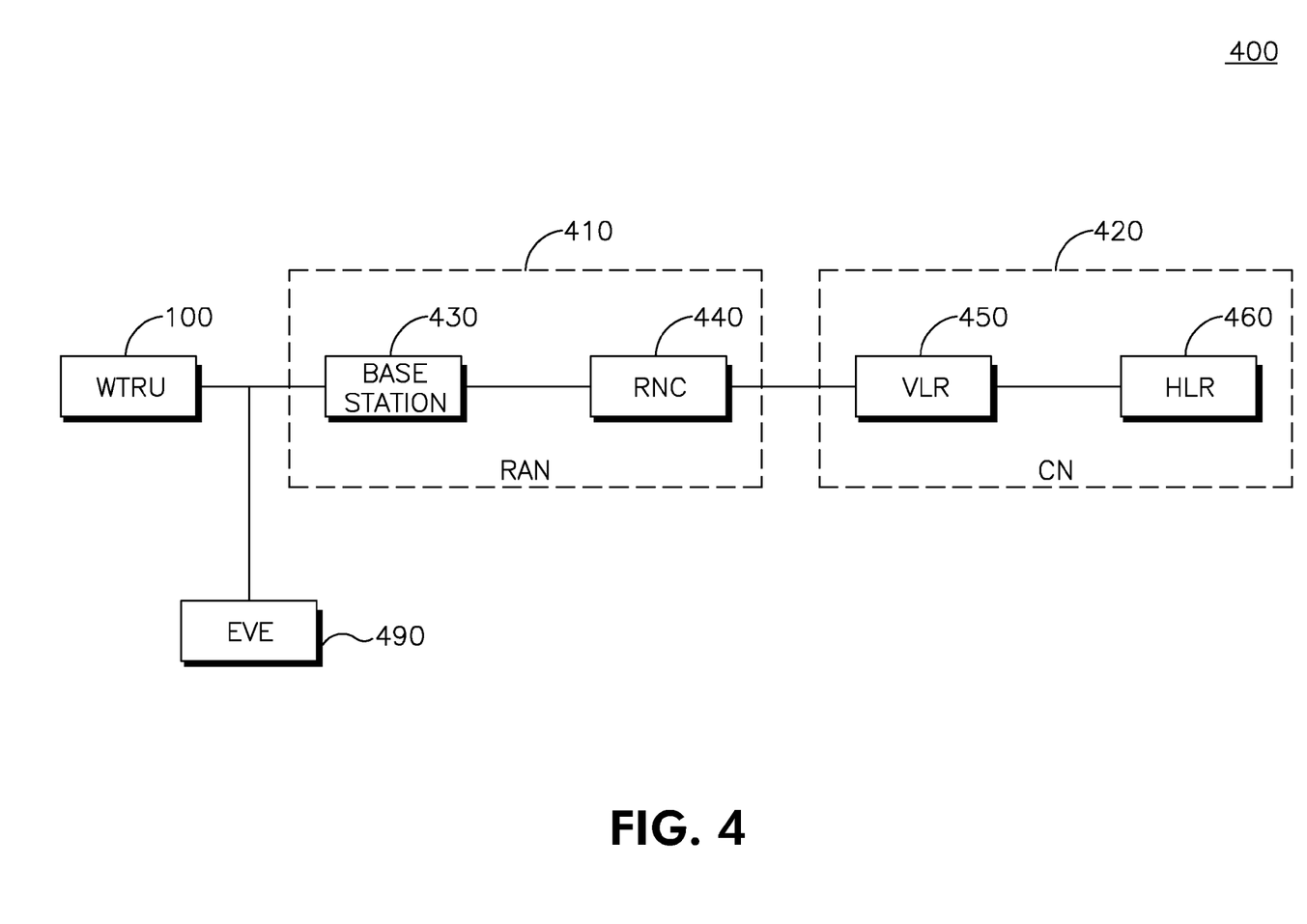
FIG. 4 shows an example of a network for performing wireless communications.

FIG. 4 is an example block diagram of a network 400 for performing wireless communications. The network 400 includes the WTRU 100, a radio access network (RAN) 410, and a core network (CN) 420. The RAN 410 includes a base station 430, and a Radio Network Controller (RNC) 440. The CN 420 includes a Visitor Location Register (VLR) 450 and a Home Location Register (HLR) 460. The network 400 also includes an eavesdropper (EVE) 490. The base station 430 serves as a point of network entry for the RAN 410. The RNC 440 carries out various functions in wireless communication, such as radio resource management, mobility management functions, and encryption functions. The VLR 450 stores information about the WTRU 100, such as a copy of a user service profile and a device location area, which is used for wireless communications. The HLR 460, which stores a master copy of a user service profile, carries out switching functions and manages the wireless communications between the WTRU 100 and the network 400.

Figure 5:
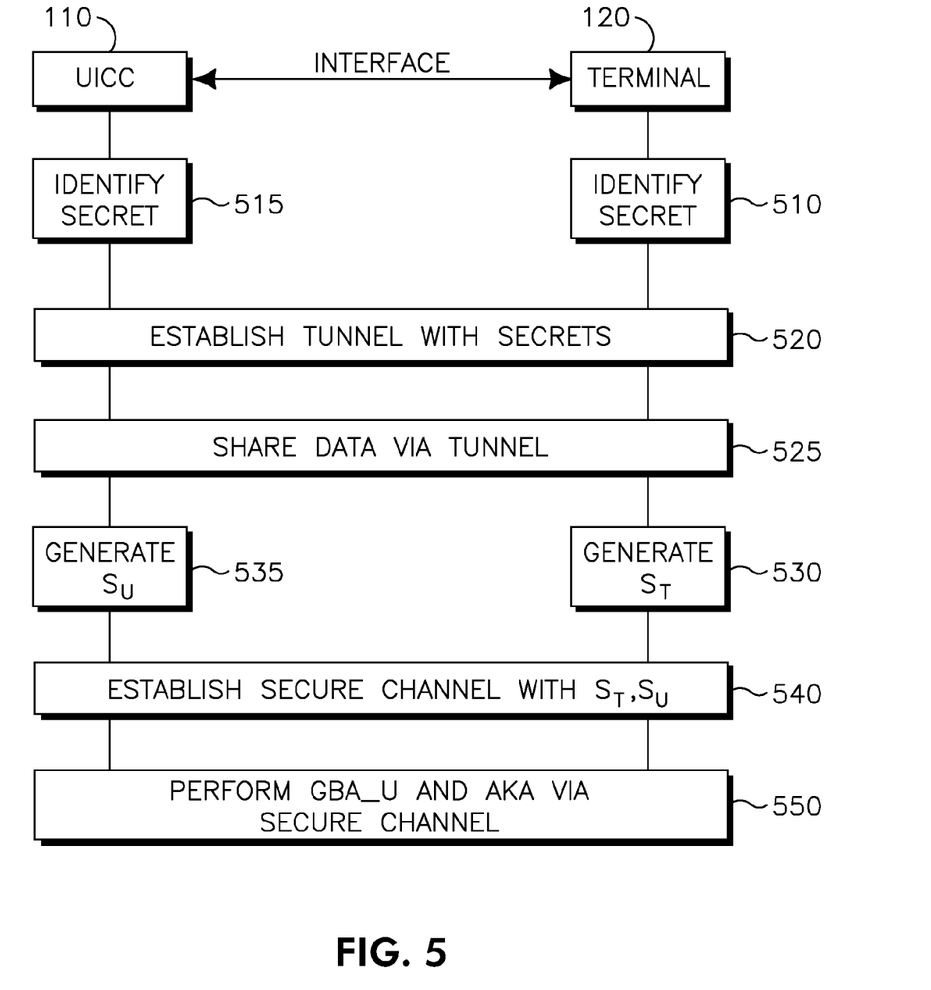
FIG. 5 is an example of session key generation for securing communications between the Universal Integrated Circuit Card and the Terminal.

FIG. 5 is an example of session key generation for securing the interface 130 between the UICC 110 and the Terminal 120. The Terminal 120 identifies a secret that can be used to encrypt communications with the UICC 110, at 510. Similarly, the UICC identifies a secret that can be used to encrypt communications with the Terminal 120, at 515. Optionally, the identified secrets are a pre-provisioned shared secret. A tunnel is established on the interface 130 using the secrets, at 520, such that a channel between the UICC 110 and the Terminal 120 is secured with the respective secrets. The tunnel is used to share data for use in deriving a secure shared session key, at 525.

Next, the Terminal 120 derives a secure shared session key $S_T$ from it's secret, at 530. Similarly, the UICC 110 derives a secure shared session key $S_U$ from it's secret, at 535. Optionally, the UICC 110 and the Terminal 120 also perform mutual authentication, at 530, 535. The secure shared session keys $S_T$, $S_U$ are used to establish a secure channel between the UICC 110 and the Terminal 120, at 540, such that the confidentiality and integrity of information passing through the secure channel are protected. The UICC 110 and the Terminal 120 then carry out the AKA 300 and GBA_U 400 procedures via the secure channel, at 550.

In some embodiments, the shared secret K is used to perform a keyed pseudorandom function (PRF) that is capable of accommodating arbitrary-length inputs, such as HMAC with SHA-256, encrypted CBC MAC with AES-128, or the AKA security functions. A PRF using a shared secret K and an input, x, may be denoted as $f_K(x)$. Similarly, the notation $f_K(x,y)$ indicates that the PRF is performed on a concatenation of the arguments shown. A PRF family is a set of related one-way, non-invertible, PRFs, wherein a value of variable bit-length is transformed to a bit sequence of fixed length (i.e., 128 or 256). For example a first PRF in a PRF family may be denoted as $f_K(0, Y, Z)$ and a second PRF in the PRF family may be denoted as $f_K(1, Y, Z)$, such that the PRF having the leading 0 produces a different result than the PRF having the leading 1.

In some embodiments, the Terminal 120 is configured to generate a random challenge (RAND), an anonymity key (AK), and a sequence number (SQN). Terminal 120 is also configured to compute a message authentication code (MAC), an Expected Response (XRES), an expected sequence number (XSQN), or an authentication value (Tag). Similarly, the UICC 110 is configured to generate a response (RES) or an expected authentication value (XTag). One having ordinary skill in the art would recognize that a RAND, an AK, a SQN, a MAC, and a XRES may be produced in accordance with any of a number of respective functions known in the art. Optionally, the functions may be the key generation functions defined by the 3$^{rd}$ generation partnership project (3GPP). The Terminal 120 is also configured to send the calculated values to the UICC 110. The Terminal 120 is also configured to receive a response (RES) from the UICC 110 and to compare calculated values with received values for authentication of the UICC 110. Similarly, the UICC 110 is configured to send the values to the Terminal 120, and to compare calculated values with received values for authentication of the UICC 110. The Terminal 120 and UICC 110 are also configured to independently derive shared values, such as shared session keys and anonymity keys. For clarity, values produced at the UICC 110 may be indicated with the subscript U, and values produced at the Terminal 120 may be indicated with the subscript T. For example, $AK_U$ at the UICC 110 has the same value as $AK_T$ at the Terminal 120.

Figure 6:
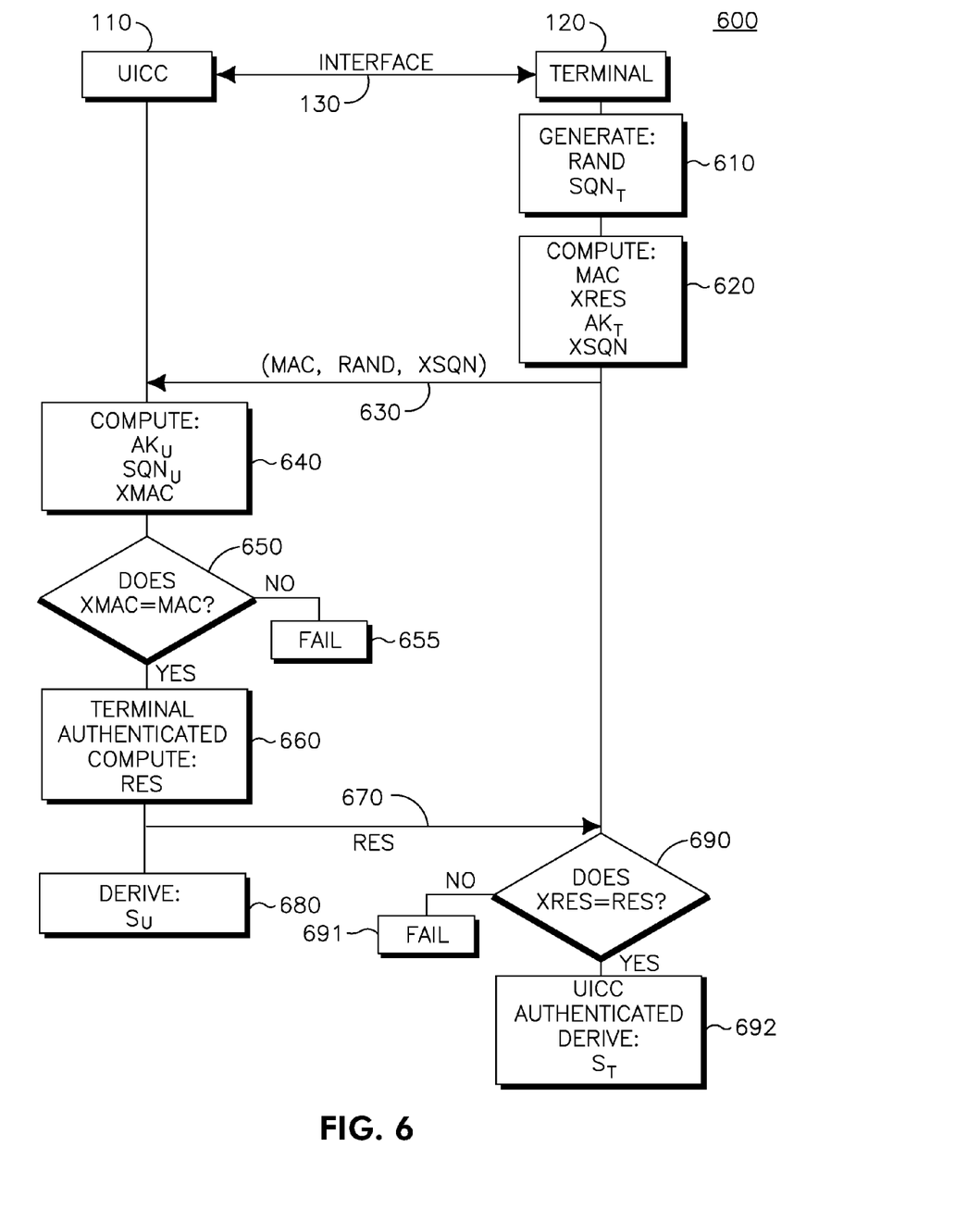
FIG. 6 shows an example of explicit mutual authentication using the AKA procedure.

FIG. 6 shows an example of an explicit mutual authentication and session key generation method 600. First, the Terminal 120 generates a RAND and a $SQN_T$, at 610. The Terminal 120 also computes a MAC, an XRES, an $AK_T$, and a XSQN, at 620. The MAC is computed based on the shared secret K, the RAND, and the $SQN_T$. The XRES represents an authentication code and is computed using the shared secret K and the RAND. The $AK_T$ is generated using the shared secret K and the RAND. Optionally, the $AK_T$ is the same size as the $SQN_T$. The XSQN is computed by performing a bitwise exclusive-or (XOR or $\oplus$) of the SQN and the $AK_T$.

Next, the Terminal 120 sends the MAC, the RAND, and the XSQN to the UICC 110 over the interface 130, at 630. The UICC 110 computes an $AK_U$, a $SQN_U$, and an expected MAC (XMAC), at 640. The $AK_U$ is calculated using the shared secret K and the received RAND. The $SQN_U$ is calculated by performing a bitwise exclusive-or of the $AK_U$ and the XSQN. The XMAC is calculated using the shared secret K, the RAND, and the $SQN_U$. Optionally, the function used to calculate the $AK_U$ at the UICC 110 is identical to the function used to calculate the $AK_T$ at the Terminal 120.

Next the UICC 110 compares the XMAC with MAC, at 650. If the XMAC and the MAC are not equal, the authentication process fails and terminates with a fail condition, at 655. Optionally, the authentication process may be restarted after a predetermined interval. Otherwise, the Terminal 120 is authenticated, and the UICC 110 computes a RES using the shared secret K and RAND, at 660. The UICC 110 sends the RES to the Terminal 120, at 670, and derives a shared session key $S_U$, at 680. For example, the shared session keys are derived using the RAND and the shared secret K.

Finally, the Terminal 120 compares the RES with the XRES, at 690. If the RES and the XRES are not equal, the authentication process fails and terminates with a fail condition, at 691. Optionally, the authentication process may be restarted after a predetermined interval. Otherwise, the UICC 110 is authenticated, and the Terminal 120 derives a shared session key $S_T$, at 692. The UICC 110 and the Terminal 120 then use the shared session key $S_U$, $S_T$ to perform the GBA_U 400 and AKA 300 procedures.

Figure 7:
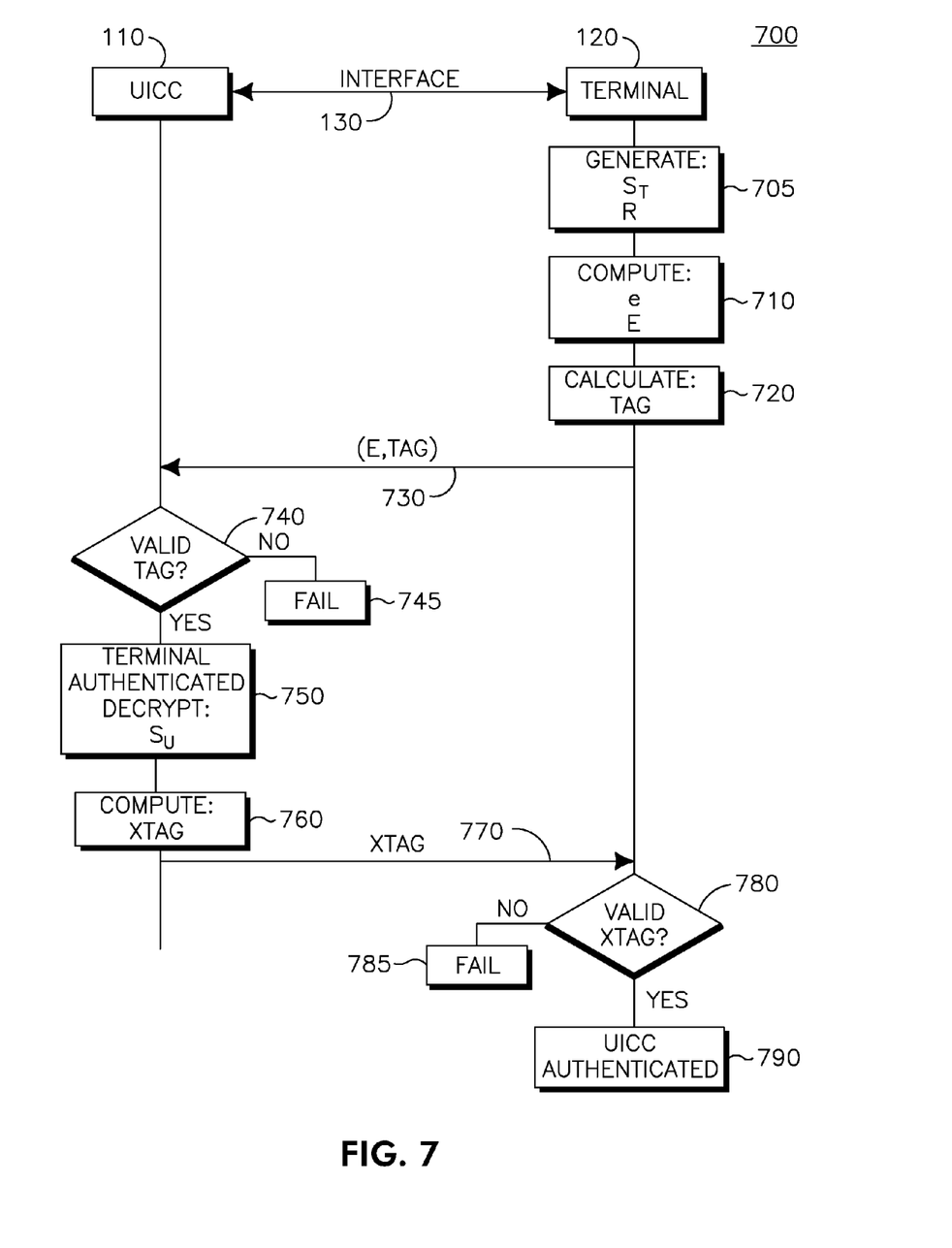
FIG. 7 shows an example of explicit mutual authentication using one-time authenticated encryption.

FIG. 7 shows an example of an explicit mutual authentication and session key generation method 700 using one-time authenticated encryption. The Terminal 120 generates a session key $S_T$ and a nonce R, at 705. Optionally, the nonce R is selected using a counter and the counter is incremented. The Terminal 120 computes the encrypted session key e of the session key $S_T$ using the shared secret K, the nonce R, and a tuple E of the nonce R and the encrypted session key e at 710. The tuple E is generated by an encryption process according to the following vector notation:

$$E=(R,e=f_K(0,R)\oplus S_T). \quad\quad\quad \text{Equation (1)}$$

The Terminal 120 then calculates an authentication value Tag using the shared secret K, the nonce R and the encrypted session key e at 720, according to the following equation:

$$\text{Tag}=f_K(0,R,e). \quad\quad\quad \text{Equation (2)}$$

Next, the Terminal 120 sends the tuple E and the authentication value Tag to the UICC 110 over the interface 130, at 730. The UICC 110 uses the shared secret K and the received tuple E to validate the received authentication value Tag, at 740. This validation may be denoted as:

$$\text{Tag}==f_K(0,R,e). \quad\quad\quad \text{Equation (3)}$$

If the received authentication value Tag is not validated, the authentication process fails and terminates with a fail condition, at 745. Optionally, the authentication process may be restarted after a predetermined interval. Otherwise, the Terminal 120 is authenticated and the UICC decrypts the session key $S_U$, at 750, according to the following equation:

$$S_U=f_K(0,R)\oplus e. \quad\quad\quad \text{Equation (4)}$$

Next, the UICC 110 computes an expected authentication value (XTag), at 760. This computation may be denoted as:

$$X\text{Tag}=f_K(1,R). \quad\quad\quad \text{Equation (5)}$$

The UICC 110 sends the expected authentication value XTag to the Terminal 120 over the interface 130, at 770. The Terminal 120 uses the shared secret K and the nonce R to validate the received XTag, at 780. This validation may be denoted as:

$$X\text{Tag}==f_K(1,R). \quad\quad\quad \text{Equation (6)}$$

If the XTag is validated the UICC 110 is authenticated, at 790. Otherwise, the authentication process fails and terminates with a fail condition, at 791. Optionally, the authentication process may be restarted after a predetermined interval.

Figure 8:
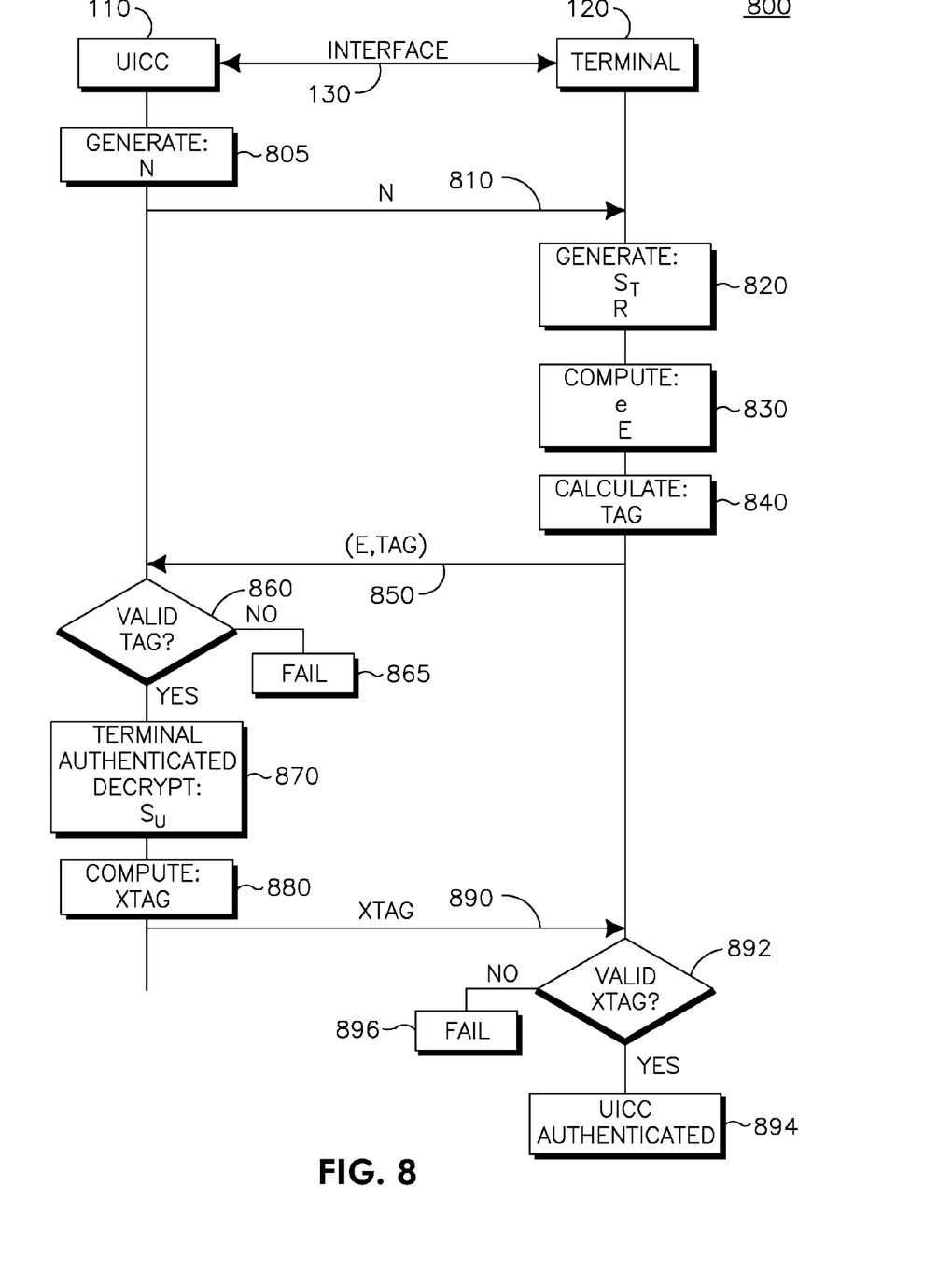
FIG. 8 shows an example of explicit mutual authentication using one-time authenticated encryption and replay protection.

FIG. 8 shows an example of an explicit mutual authentication and session key generation method 800 using one-time authenticated encryption and replay attack protection. The UICC 110 generates a nonce N at 805. Although a nonce is shown in FIG. 8, any appropriate pre-key negotiation parameter may be used. Optionally, the nonce N is generated using a counter and the counter is incremented. The UICC 110 then sends the nonce N to the Terminal 120 over the interface 130, at 810.

The Terminal 120 generates a session key $S_T$ and a nonce R, at 820. Optionally, the nonce R is generated using a counter and the counter is incremented. The Terminal 120 computes the encrypted session key e of the session key $S_T$ using the shared secret K and the nonce R per Equation 1, at 830. The Terminal 120 then calculates an authentication value Tag, using the shared secret K, the nonce R, the encrypted session key e, and the nonce N, at 840. This calculation may be denoted as:

$$\text{Tag}=f_K(0,R,e,N). \quad\quad\quad \text{Equation (7)}$$

Next, the Terminal 120 sends the authentication value Tag and a tuple E of the nonce R, and the encrypted session key e to the UICC 110 over the interface 130, at 850. The UICC 110 uses the shared secret K, the received tuple E, and the nonce N, to validate the received authentication value Tag, at 860. This validation may be denoted as:

$$\text{Tag}==f_K(0,R,e,N). \quad\quad\quad \text{Equation (8)}$$

If the received authentication value Tag is not validated, the authentication process fails and terminates with a fail condition, at 865. Optionally, the authentication process may be restarted after a predetermined interval. Otherwise, the UICC decrypts the session key $S_U$, per Equation 4, at 870. Next, the UICC 110 computes an expected authentication value XTag per Equation 5, at 880.

The UICC 110 sends the XTag to the Terminal 120 over the interface 130, at 890. The Terminal 120 uses the nonce R to validate the received XTag per Equation 6, at 892. If the XTag is validated, the UICC 110 is authenticated, at 894. Otherwise, the authentication process fails and terminates with a fail condition, at 896. Optionally, the authentication process may be restarted after a predetermined interval.

Figure 9:
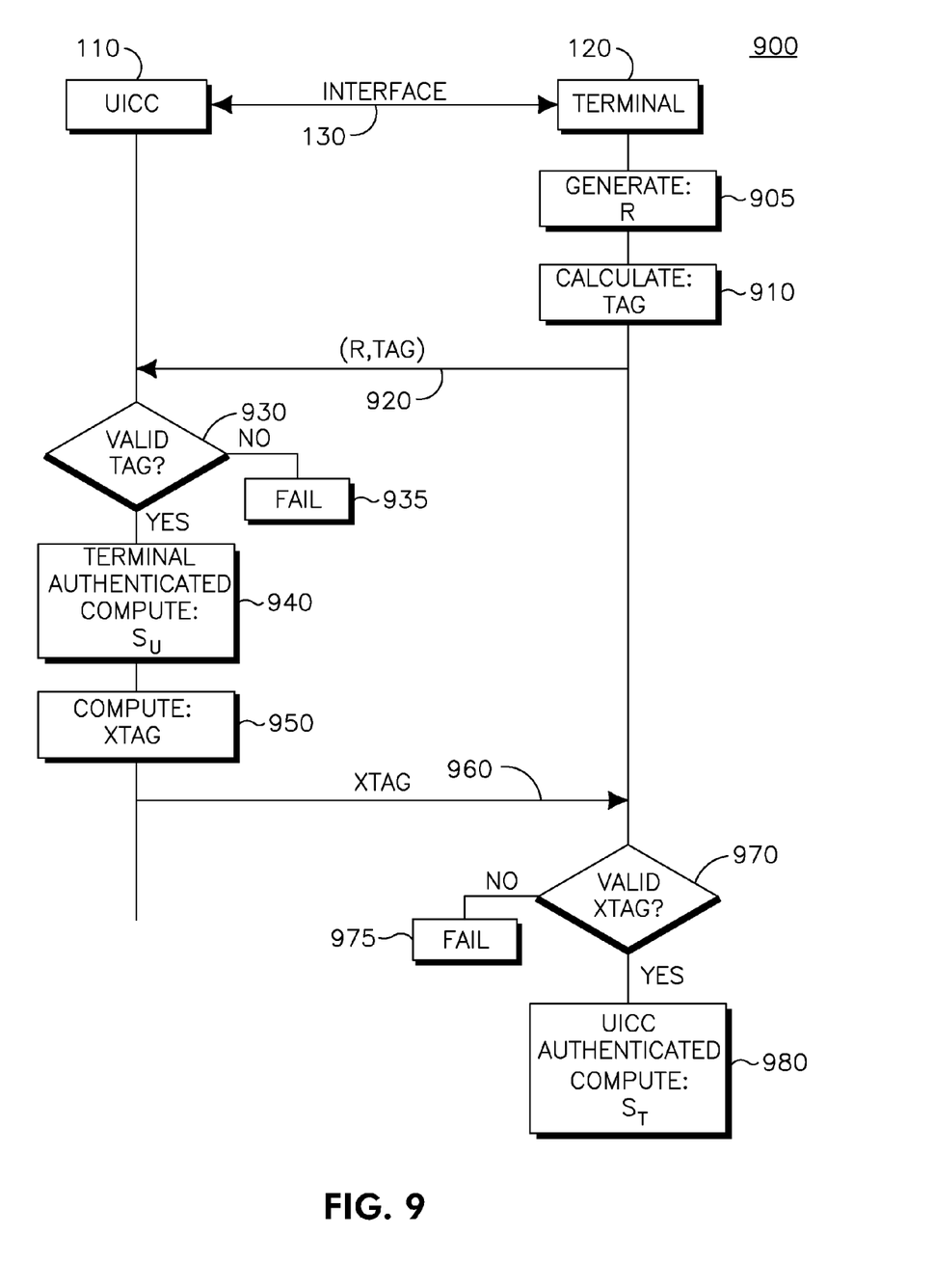
FIG. 9 shows an example of implicit mutual authentication.

FIG. 9 shows an example of implicit mutual authentication and session key generation. The Terminal 120 generates a nonce R, at 900. Optionally, the nonce R is generated using a counter and the counter is incremented. The Terminal 120 then calculates an authentication value Tag using the shared secret K and the nonce R, at 910. This calculation may be denoted as:

$$\text{Tag}=f_K(0,R). \quad\quad\quad \text{Equation (9)}$$

Next, the Terminal 120 sends nonce R and the authentication value Tag to the UICC 110 over the interface 130, at 920. The UICC 110 uses the shared secret K and the nonce R to validate the received authentication value Tag, at 930. This validation may be denoted as:

$$\text{Tag}==f_K(0,R). \quad\quad\quad \text{Equation (10)}$$

If the received authentication value Tag is not validated, the authentication process fails and terminates with a fail condition, at 935. Optionally, the authentication process may be restarted after a predetermined interval. Otherwise, the Terminal 120 is authenticated and the UICC 110 computes session key $S_U$ using the shared secret K and the nonce R, at 940. The session key computation may be denoted as:

$$S_U=f_K(2,R). \quad\quad\quad \text{Equation (11)}$$

Next, the UICC 110 computes an expected authentication value XTag per Equation 5, at 950. The UICC 110 sends the expected authentication value XTag to the Terminal 120 over the interface 130, at 960. The Terminal 120 uses the nonce R to validate the received expected authentication value XTag per Equation 6, at 970. If the received expected authentication value XTag is not validated the authentication process fails and terminates with a fail condition, at 975. Optionally, the authentication process may be restarted after a predetermined interval. Otherwise, the UICC 110 is authenticated, and the Terminal 120 computes the session key $S_T$ using the shared secret K and the nonce R, at 980. The session key computation may be denoted as:

$$S_T=f_K(2,R). \quad\quad\quad \text{Equation (12)}$$

Figure 10:
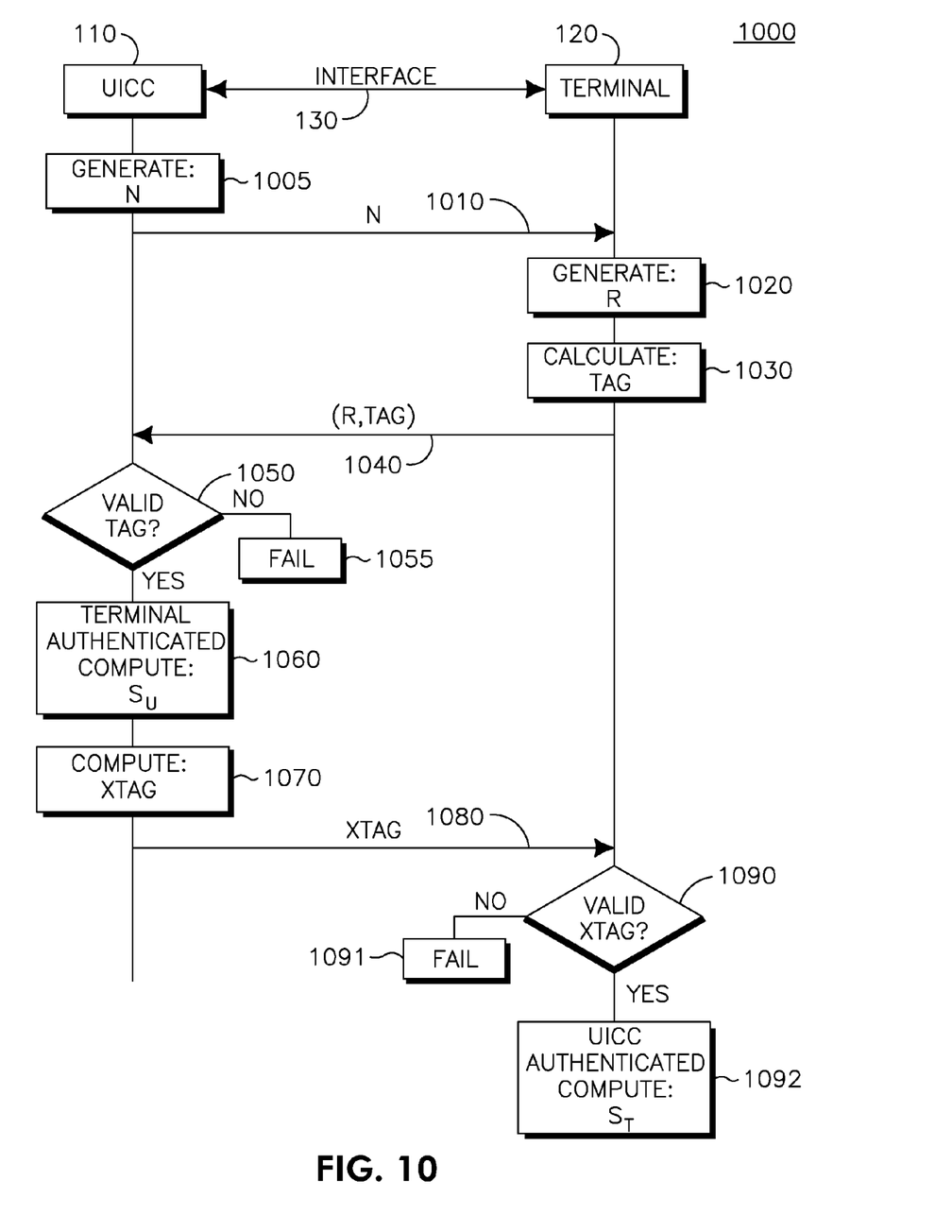
FIG. 10 shows an example of implicit mutual authentication with replay protection.

FIG. 10 shows an example of implicit mutual authentication and session key generation with replay protection. The UICC 110 generates a nonce N, at 1005. Optionally, the nonce N is generated using a counter and the counter is incremented. The UICC 110 then sends the nonce N to the Terminal 120 over the interface 130, at 1010.

The Terminal 120 generates a nonce R, at 1020. Optionally, the nonce R is generated using a counter and the counter is incremented. The Terminal 120 then calculates an authentication value Tag using the nonce R and the nonce N, at 1030. This calculation may be denoted as:

$$Tag = f_K(0, R, N). \quad \text{Equation (13)}$$

Next, the Terminal 120 sends nonce R and the authentication value Tag to the UICC 110 over the interface 130, at 1040. The UICC 110 uses the shared secret K, the nonce R, and the nonce N to validate the received authentication value Tag, at 1050. This validation may be denoted as:

$$Tag == f_K(0, R, N). \quad \text{Equation (14)}$$

If the received authentication value Tag is not validated, the authentication process fails and terminates with a fail condition, at 1055. Optionally, the authentication process may be restarted after a predetermined interval. Otherwise, the Terminal 120 is authenticated and the UICC 110 computes the session key $S_U$ using the shared secret K and the nonce R, per Equation 11, at 1060. Next, the UICC 110 computes an expected authentication value XTag, per Equation 5, at 1070. The UICC 110 sends the expected authentication value XTag to the Terminal 120 over the interface 130, at 1080.

Next, the Terminal 120 uses the nonce R to validate the received expected authentication value XTag per Equation 6, at 1090. If the received expected authentication value XTag is not validated the authentication process fails and terminates with a fail condition, at 1091. Optionally, the authentication process may be restarted after a predetermined interval. Otherwise, the UICC 110 is authenticated and the Terminal 120 computes the session key $S_T$, using the shared secret K and the nonce R, at 1092. The session key computation may be denoted as:

$$S_T = f_K(2, R). \quad \text{Equation (15)}$$

Figure 11:
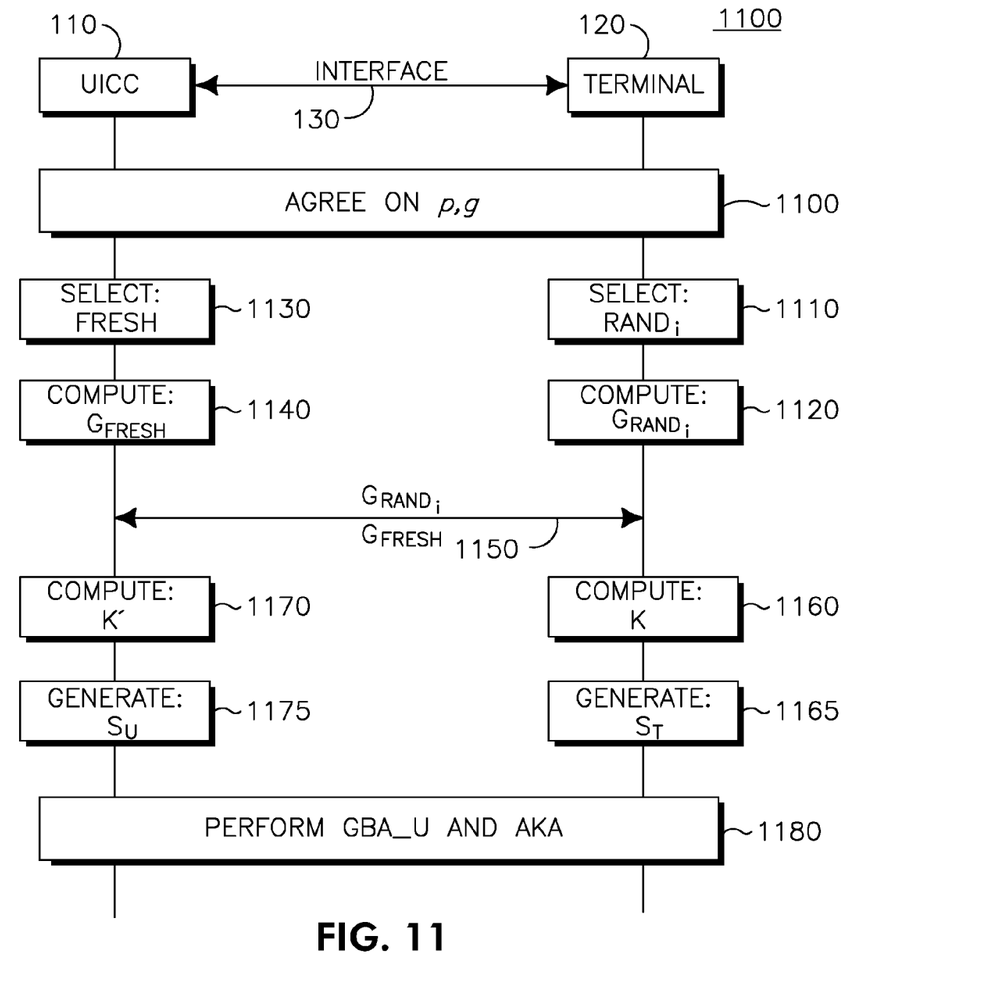
FIG. 11 shows an example of shared secret key establishment without authentication.

FIG. 11 shows an example of shared secret key establishment without authentication using a Diffie-Hellman key exchange protocol. First, the UICC 110 and the Terminal 120 agree upon a very large prime number, p, and a generator, g, of a large, prime-order subgroup H of $F_p^*$ at 1100. The algebraic structure employed is the multiplicative group $F_p^*$, derived from the field $F_p$. The large, prime-order subgroup H of $F_p^*$ is of prime order, is cyclic, and contains the generator g, such that, for any member a of H of $F_p^*$ an integer n can be found such that $a = g^n \mod p$. The values p and g are known publically, and represent a public key part of a key pair.

Next, the Terminal 120 randomly selects a private key, $RAND_i$, such that the private key $RAND_i$ is at least one (1) and is not greater than two (2) less than the very large prime number p, at 1110. The Terminal 120 computes $g_{RAND_i}$ from the private key $RAND_i$, at 1120. This computation may be denoted as:

$$g_{RAND_i} = g^{RAND_i} \mod p. \quad \text{Equation (16)}$$

Similarly, the UICC 110 selects a private key, FRESH, such that the private key FRESH is at least one (1) and is not greater than two (2) less than the very large prime number p, at 1130. Then the UICC 110 computes $g_{FRESH}$ from the private key FRESH, at 1140. This computation may be denoted as:

$$g_{FRESH} = g^{FRESH} \mod p. \quad \text{Equation (17)}$$

Next, the UICC 110 and the Terminal 120 exchange $g_{RAND_i}$ and $g_{FRESH}$ over the interface 130, at 1150.

Next, the Terminal 120 computes the shared secret, K, using the private key $R_{AND_i}$ and the received $g_{FRESH}$, at 1160. This computation may be denoted as:

$$K = g_{FRESH}^{RAND_i} \mod p. \quad \text{Equation (18)}$$

Similarly, the UICC 110 computes the shared secret, K, using the private key FRESH and the received $g_{RAND_i}$, at 1170. This computation may be denoted as:

$$K' = g_{RAND_i}^{FRESH} \mod p. \quad \text{Equation (19)}$$

The Terminal 120 and the UICC 110 now possess a shared secret, K'=K, which is then used to compute a secure secret session key S, at 1165, 1175. The secure secret session key S is used to perform the GBA_U and AKA procedures by securing the interface 130, at 1180.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), Terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for securing communications between a Universal Integrated Circuit Card (UICC) and a Terminal, the method comprising:
generating a first secure shared session key, wherein the first secure shared session key is configured to enable secure communication between the UICC and the Terminal, during a procedure that requires communications between the UICC and the Terminal, wherein the procedure is at least one of an authentication and key agreement (AKA) procedure or a generic bootstrapping architecture (GBA) procedure;
encrypting communications between the UICC and the Terminal using the first secure shared session key to establish a secure channel between the UICC and the Terminal;
performing, via the established secure channel between the UICC and the Terminal, the at least one of the AKA procedure or the GBA procedure resulting in generation of a second secure shared session key, whereby communications between the UICC and the Terminal resulting in generation of the second secure shared session key are encrypted by the first secure shared session key; and using the second secure shared session key to encrypt communications to and from the Terminal subsequent to the at least one of the AKA procedure or the GBA procedure.

2. The method of claim 1, wherein generating the first secure shared session key includes deriving the first secure shared session key from a shared secret.

3. The method of claim 2, wherein deriving the first secure shared session key from the shared secret includes generating the shared secret from a secret.

4. The method of claim 2, wherein deriving the first secure shared session key includes performing a pseudorandom function (PRF) using the shared secret.

5. The method of claim 1 wherein the GBA procedure includes an application level GBA with UICC-based enhancements (GBA_U) procedure.

6. The method of claim 1, further comprising: creating a tunnel on an interface between the UICC and the Terminal.

7. The method of claim 1, wherein generating the first secure shared session key includes:
determining whether there is an existing secure shared session key between the UICC and the Terminal; and
on a condition that there is not an existing secure shared session key between the UICC and the Terminal, generating the first secure shared session key.

8. The method of claim 1, wherein generating the first secure shared session key includes:
producing a produced key negotiation parameter;
reporting the produced key negotiation parameter to the UICC;
receiving a received key negotiation parameter; and
creating the first secure shared session key using the produced key negotiation parameter and the received key negotiation parameter.

9. The method of claim 8, wherein the creating includes:
determining whether the produced key negotiation parameter is the same as the received key negotiation parameter; and
on a condition that the produced key negotiation parameter is the same as the received key negotiation parameter, deriving the first secure shared session key.

10. The method of claim 8, wherein the producing includes:
selecting a random challenge (RAND) and a sequence number (SQN);
calculating an anonymity key (AK), a message authentication code (MAC), an expected response (XRES), and an expected sequence (XSQN); and
combining the RAND, the MAC, and the XSQN to produce the produced key negotiation parameter.

11. The method of claim 10, wherein the calculating includes:
computing the AK using a shared secret and the RAND;
computing the MAC using the shared secret, the RAND, and the SQN;
computing the XRES using the shared secret and the RAND; and
computing the XSQN using the SQN and the AK.

12. The method of claim 8, wherein the producing includes:
selecting a nonce;
calculating an authentication value (Tag); and
combining the nonce and the Tag to produce the produced key negotiation parameter.

13. The method of claim 8, wherein the producing includes:
selecting a session key;
calculating an encrypted session key; and
using the encrypted session key to produce the key negotiation parameter.

14. The method of claim 1, wherein generating the first secure shared session key includes:
receiving a received key negotiation parameter;
producing a produced key negotiation parameter;
reporting the produced key negotiation parameter to the Terminal; and
creating the first secure shared session key using the received key negotiation parameter and the produced key negotiation parameter.

15. The method of claim 14, wherein the creating includes:
determining whether the produced key negotiation parameter is the same as the received key negotiation parameter; and
on a condition that the produced key negotiation parameter is the same as the received key negotiation parameter, deriving the first secure shared session key.

16. The method of claim 14, wherein the producing includes:
extracting a random challenge (RAND), a message authentication code (MAC), and an expected sequence (XSQN) from the received key negotiation parameter;
calculating an anonymity key (AK), an expected message authentication code (XMAC), and a sequence number (SQN);
determining whether the XMAC is the same as the MAC; and
on a condition that the XMAC is the same as the MAC, computing a response (RES) using a shared secret and the RAND.

17. The method of claim 16, wherein the calculating includes:
computing the AK using the shared secret and the RAND;
computing the SQN using the XSQN and the AK; and
computing the XMAC using the shared secret, the RAND, and the SQN.

18. The method of claim 14, wherein the producing includes:
extracting a nonce and a Tag from the received key negotiation parameter;
validating the Tag;
on a condition that the Tag is valid, deriving a session key and computing an expected authentication value (XTag); and
producing the produced key negotiation parameter using the XTag.

19. The method of claim 18, wherein the producing includes extracting an encrypted session key from the received key negotiation parameter; and deriving a session key includes decrypting the encrypted session key.

20. The method of claim 1, wherein generating the first secure shared session key includes:
generating a pre-key negotiation parameter; and
reporting the pre-key negotiation parameter to the Terminal.

21. The method of claim 1, wherein generating the first secure shared session key includes: receiving a pre-key negotiation parameter from the UICC.

22. The method of claim 1, wherein the generating includes performing a Diffie-Hellman key exchange protocol.

23. A wireless transmit/receive unit (WTRU), the WTRU comprising:
a Universal Integrated Circuit Card (UICC) configured to:
generate a first secure shared session key, wherein the first secure shared session key is configured to enable secure communication, between the UICC and a Terminal, during a procedure that requires communications between the UICC and the Terminal, wherein the procedure is at least one of an authentication and key agreement (AKA) procedure or a generic bootstrapping architecture (GBA) procedure, and the Terminal configured to:
generate the first secure shared session key,
encrypt communications with the first secure shared session key to establish a secure channel between the Terminal and the UICC;
perform, via the established secure channel between the UICC and the Terminal, the at least one of the AKA procedure or the GBA procedure resulting in generation of a second secure shared session key, whereby communications between the UICC and the Terminal resulting in generation of the second secure shared session key are encrypted by the first secure shared session key; and
use the second secure shared session key to encrypt communications subsequent to the at least one of the AKA procedure or the GBA procedure.

24. The WTRU of claim 23, wherein the UICC is configured to generate the first secure shared session key by deriving the first secure shared session key from a shared secret, and the Terminal is configured to generate the first secure shared session key by deriving the first secure shared session key from the shared secret.

25. The WTRU of claim 24, wherein the UICC is configured to derive the first secure shared session key from the shared secret by generating the shared secret from a first secret, and the Terminal is configured to derive the first secure shared session key from the shared secret by generating the shared secret from a second secret.

26. The WTRU of claim 24, wherein the UICC is configured to derive the first secure shared session key by performing a pseudorandom function (PRF) using the shared secret, and the Terminal is configured to derive the first secure shared session key by performing the pseudorandom function (PRF) using the shared secret.

27. The WTRU of claim 23, wherein the UICC is configured to establish the secure channel with the Terminal.

28. The WTRU of claim 27, wherein the GBA procedure includes an application level generic bootstrapping architecture (GBA) with UICC-based enhancements (GBA_U) procedure.

29. The WTRU of claim 23, wherein the Terminal is configured to:
produce a produced key negotiation parameter;
report the produced key negotiation parameter to the UICC;
receive a received key negotiation parameter from the UICC; and
generate the first secure shared session key using the produced key negotiation parameter and the received key negotiation parameter.

30. The WTRU of claim 29, wherein the Terminal is configured to:
determine whether the produced key negotiation parameter is the same as the received key negotiation parameter; and
generate the first secure shared session key, on a condition that the produced key negotiation parameter is the same as the received key negotiation parameter.

31. The WTRU of claim 29, wherein the Terminal is configured to:
select a random challenge (RAND) and a sequence number (SQN);
calculate an anonymity key (AK), a message authentication code (MAC), an expected response (XRES), and an expected sequence (XSQN); and
produce the produced key negotiation parameter using the RAND, the MAC, and the XSQN.

32. The WTRU of claim 31, wherein the Terminal is configured to:
calculate the AK using a shared secret and the RAND;
calculate the MAC using the shared secret, the RAND, and the SQN;
calculate the XRES using the shared secret and the RAND; and
calculate the XSQN using the SQN and the AK.

33. The WTRU of claim 29, wherein the Terminal is configured to:
select a nonce;
calculate an authentication value (Tag); and
produce the produced key negotiation parameter using the nonce and the Tag.

34. The WTRU of claim 29, wherein the Terminal is configured to:
select a session key;
calculate an encrypted session key; and
produce the produced key negotiation parameter using the encrypted session key.

35. The WTRU of claim 23, wherein the UICC is configured to:
receive a received key negotiation parameter from the Terminal;
produce a produced key negotiation parameter;
report the produced key negotiation parameter to the Terminal; and
generate the first secure shared session key using the received key negotiation parameter and the produced key negotiation parameter.

36. The WTRU of claim 35, wherein the UICC is configured to:
determine whether the produced key negotiation parameter is the same as the received key negotiation parameter; and
generate the first secure shared session key, on a condition that the produced key negotiation parameter is the same as the received key negotiation parameter.

37. The WTRU of claim 35, wherein the UICC is configured to:
extract a random challenge (RAND), a message authentication code (MAC), and an expected sequence (XSQN) from the received key negotiation parameter;
calculate an anonymity key (AK), an expected message authentication code (XMAC), and a sequence number (SQN);
determine whether the XMAC is the same as the MAC;
compute a response (RES) using a shared secret and the RAND, on a condition that the XMAC is the same as the MAC; and
produce the produced key negotiation parameter using the RES.

38. The WTRU of claim 37, wherein the UICC is configured to:
  calculate the AK using the shared secret and the RAND;
  calculate the SQN using the XSQN and the AK; and
  calculate the XMAC using the shared secret, the RAND, and the SQN.

39. The WTRU of claim 35, wherein the UICC is configured to:
  extract a nonce and a Tag from the received key negotiation parameter;
  validate the Tag;
  compute an expected authentication value (XTag); and
  produce the produced key negotiation parameter using the Xtag.

40. The WTRU of claim 39, wherein the UICC is configured to:
  extract an encrypted session key from the received key negotiation parameter;
  decrypt the encrypted session key; and
  generate the first secure shared session key using the decrypted session key.

41. The WTRU of claim 23, wherein the UICC is configured to:
  generate a pre-key negotiation parameter; and
  report the pre-key negotiation parameter to the terminal.

42. The WTRU of claim 23, wherein the Terminal is configured to:
  receive a pre-key negotiation parameter from the UICC.

43. The WTRU of claim 23, wherein the UICC is configured to perform a Diffie-Hellman key exchange protocol, and the Terminal is configured to perform the Diffie-Hellman key exchange protocol.

* * * * *